United States Patent Office 2,720,624
Patented Oct. 11, 1955

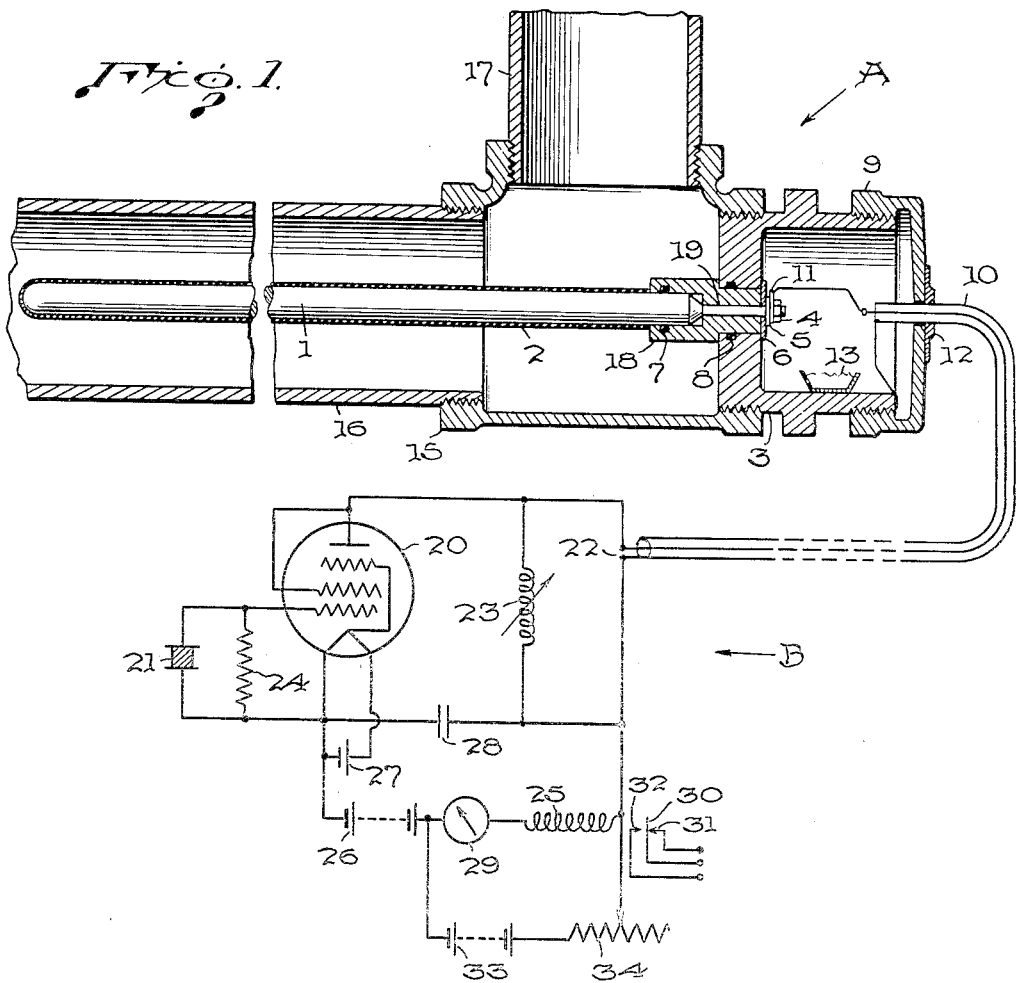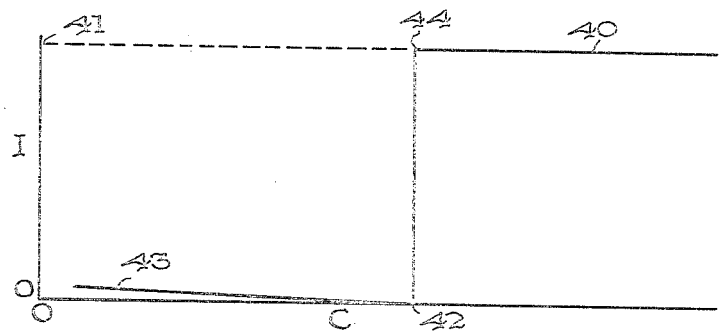

2,720,624

APPARATUS FOR DETECTING CHANGES IN COMPOSITION OF A LIQUID HYDROCARBON STREAM

Samuel Burton Gunst, Pittsburgh, and Frank C. Alexander, Jr., Glenshaw, Pa., assignors to Gulf Research & Development Company, Pittsburgh, Pa., a corporation of Delaware Application September 7, 1951, Serial No. 245,602

4 Claims. (Cl. 324—61)

This invention concerns a system for detecting specified changes in the character of an oil stream, and more particularly concerns apparatus for detecting and/or indicating changes in the dielectric constant of a liquid hydrocarbon stream passing therethrough with a high degree of precision and capable of maintaining its high precision over a large range.

It is known that the insulating properties of oil may be used to detect the presence of water in an oil stream. Besides affecting the insulating properties of oil, the presence of water is also reflected by changes in the dielectric constant of the mixture. It is further known that different hydrocarbons have different dielectric constants and may be distinguished thereby. The present invention is based on the fact that the presence of water, or changes in the hydrocarbon composition of the oil, change the effective dielectric constant, and this property is employed by the apparatus of our invention to detect such water contamination or change in composition.

It is customary in making dielectric-constant measurements to pass the material to be tested through an electrical condenser whose electrical capacity is measured, generally in a bridge circuit. However, such apparatus is subject to errors of measurement, the sensitivity to capacity changes is a variable and influenced by conductivity of the material under test, frequency changes, etc. At the same time the use of low capacities in the prior systems necessitates certain special precautions, the use of high-precision impedance bridges, etc. which are very inconvenient to use and are also very costly to construct.

The apparatus of our invention employs an electric condenser or probe through or past which the oil stream flows, and said condenser is connected in a crystal-oscillator circuit of a kind which undergoes a large step in the D.-C. plate current of its vacuum tube, which step effects operation of a relay employed for actuating an indicator, alarm, recorder, or any other desired exhibiting means. The D.-C. plate-current step is substantially larger than the relay differential, i. e. the D.-C. plate-current step greatly exceeds the difference in relay current required to cause the condition of the relay to change from "open" to "closed." In our invention the capacity value at which the D.-C. plate-current step takes place, i. e. the operating point, may be adjustably shifted to lie at any desired point with a substantial range, termed the operating range. The magnitude of the D.-C. plate-current step is substantially independent of the position of the operating point within the operating range. The capacity value at the operating point is termed the critical capacitance and the sensitivity of the apparatus at this point is called the critical sensitivity, sensitivity being defined as the change in relay-coil current divided by the change in capacitance which is required to produce this change. Since in our invention the D.-C. plate-current step exceeds the relay differential for any desired operating point, our invention is characterized by having a substantially constant sensitivity for all ranges of dielectric constant of material in the condenser or probe. The apparatus of our invention is therefore particularly advantageous for detecting minute changes in hydrocarbon composition irrespective of the order of magnitude of the dielectric constant or degree of water contamination.

An important further characteristic of our invention is that it responds only at the critical capacitance, i. e. its sensitivity is substantially zero on both sides of the operating point. Thus, relay operation takes place only upon the material in the condenser or probe attaining a predetermined limit of dielectric constant, at which limit the relay trips from the "open" to the "closed" condition, but no operation can occur at values of dielectric constant above or below the limit.

It is accordingly an object of our invention to provide a sensitive system for detecting changes in the composition of a hydrocarbon stream.

It is a further object of our invention to provide a sensitive water-detecting system for hydrocarbon streams.

Another object of our invention is to provide a system for detecting changes in hydrocarbon composition or degree of water contamination, whose sensitivity is independent of the characteristics of the liquid at the detecting point.

Another object of our invention is to provide a system for detecting changes in hydrocarbon composition or degree of water contamination, having high sensitivity and a high degree of reliability.

Another object of our invention is to provide a system for detecting changes in hydrocarbon composition or degree of water contamination, which is characterized by a high degree of simplicity and ruggedness.

Another object of our invention is to provide a system for detecting changes in hydrocarbon composition or degree of water contamination, in which high sensitivity is attained without the need of highly-sensitive relays.

Another object of our invention is to provide a system for detecting changes in hydrocarbon composition or degree of water contamination, which is characterized by a high degree of independence of changes in temperature, atmospheric conditions, aging, power-supply variations, mechanical disturbance, geographical location, etc. whereby the system is highly advantageous for field application.

Another object of our invention is to provide a system for detecting changes in hydrocarbon composition or degree of water contamination in which high sensitivity is attained at a predetermined limit with substantially zero sensitivity on both sides of the limit.

Another object of our invention is to provide a system for detecting changes in hydrocarbon composition or degree of water contamination, which employs a step-wise discontinuity in relay-coil current when the actuating parameter passes through the operating point, in contrast to prior devices whose response varies linearly with the actuating parameter.

These and other useful objects are attained by our invention in the manner described in this specification of which the drawing forms a part, and in which Fig. 1, part A, shows a diagrammatic cross-section of one form of probe or condenser which may be employed in our invention;

Fig. 1, part B, shows a schematic wiring diagram of a type of crystal oscillator which may be employed in our invention; and Fig. 2 shows a graph of the D.-C. plate current vs. probe capacity for the apparatus of our invention.

Referring to the drawing, part A of Fig. 1 shows a portion of the conduit system through which the liquid to be tested is caused to flow. A unit such as is shown may be installed in a pipe line, e. g. a gathering line from an oil well, a product-transport line, a fuel line, or a lubricating-oil line, so that all or a fixed representative fraction of the material flows therethrough. The unit shown in Fig. 1A forms an electrical condenser comprising the insulated metallic probe 1 and the surrounding portion of metallic conduit. The condenser is preferably of such shape and size so that it does not appreciably impede the liquid flow, and this is preferably accomplished by its having a large ratio of pipe diameter to probe diameter, a ratio of greater than 4 to 1 being preferred. It is further desirable that all of the oil flowing in the pipe will pass the probe in order to mitigate the effects of trapped water or paraffin deposition so that the liquid dielectric surrounding the probe is truly representative of that in the pipe line.

The probe may be coated with a thin layer of insulation 2 to prevent corrosion of the probe metal and to minimize electrical losses when the oil is highly ionized or contains large quantities of saline water as may be the case when the apparatus is used in gathering lines from wells. It is preferred that the coating 2 be thin and have a high dielectric constant so that it will not appreciably lower the total electrical capacity of the probe. A thin coating 2 of porcelain enamel has been found useful in order to obtain these results. One end of the probe 1 is reduced in diameter as shown at 19 and threaded for a nut 4 and the other end may be rounded or streamlined. The insulated probe fits in a teflon insulator 18 inserted in a steel mounting plug 3. The probe 1 is held fixed in the mounting plug 3 by drawing up the nut 4 which compresses a brass washer 5 and a teflon insulating washer 6. Synthetic rubber O-rings 7 and 8 serve as pressure seals. A mounting-plug cover 9, threaded onto the mounting plug 3 accommodates a coaxial cable 10 whose central conductor is soldered to a lug 11 attached to the probe at the threaded end. A synthetic rubber gasket 12, held by two steel screws (not shown) which are threaded into the mounting-plug cover 9, provides a weatherseal for the coaxial cable 10. The outer conductor or braid of the coaxial cable is connected to the mounting plug 3 as shown. A small quantity of a desiccant 13 is included in the well of the mounting plug to prevent corrosion and electrical leakage due to moisture. The free end of the coaxial cable may be provided with a suitable connector (not shown) for coupling to a crystal oscillator shown schematically in part B of Fig. 1.

The probe assembly may be inserted in the pipe line in any suitable manner. A satisfactory installation is shown in Fig. 1A wherein the mounting plug 3 is threaded into a pipe T 15 connected to the pipe line 16 and 17. While the figure shows the unit in a horizontal position, it may be used vertically or in any other position.

Part B of Fig. 1 shows a wiring diagram of the type of crystal oscillator employed in our invention. An oscillator tube 20, which may, for example, be of the type 1U4 having low power consumption, has a quartz crystal 21 connected in its grid circuit and has a tuned plate circuit comprising the condenser formed by the unit shown in A of Fig. 1 and connected at terminals 22 together with an adjustable inductance 23. We have obtained satisfactory operation of our invention with a crystal 21 having a frequency of 3524 kc. p. s., but other values of frequency may be employed if desired. The grid circuit also contains grid resistor 24 further to be described below. Filament current is supplied by battery 27 and plate current by battery 26, the latter being in the neighborhood of 90 volts for the triode-connected 1U4 tube shown. A by-pass condenser 28 of about 0.01 mfd. is connected between the tuned plate circuit and the cathode.

A relay coil 25 may be connected in series with the plate battery 26 and if desired a D.-C. milliammeter or other indicator 29 may be connected in series with the relay coil. The relay armature is indicated at 30 and its associated contacts at 31 and 32, and these may lead to an exhibiting device, which may, for example, be an indicator, alarm, recorder, or controller as desired. A buckout circuit comprising battery 33 and adjustable resistor 34 may be connected across the milliammeter and relay coil as shown, so that the relay current may be set to any desired operating point. The circuit of Fig. 1B is adjusted so that oscillations set in at the desired operating point as more fully described below.

Our invention makes use of a relay of moderate sensitivity, and the crystal-oscillator circuit of Fig. 1B has at the desired relay-operating point a large step in the D.-C. plate-current of the vacuum tube 20, which step is substantially larger than the relay differential so that relay operation at the D.-C. plate-current step is always certain. This step in the D.-C. plate current takes place when the tunable circuit 22—23 is so adjusted that sustained oscillations set in. Furthermore, the combination employed in our invention has a very low sensitivity above and below the relay-operating point, so that there is no danger of erroneous operation of the relay. This results in greatly-improved reliability together with high sensitivity of control at the operating point.

Our invention employs the type of crystal oscillator shown in Fig. 1B and having a D.-C. relay in its plate circuit and is further characterized in that it is operated with a high value of grid resistance, whereby oscillations are maintained for small values of plate circuit capacity (or for correspondingly high values of plate inductance). A discontinuity or step takes place in the tube D.-C. plate current when a plate-tuned crystal oscillator of Fig. 1B goes into, or out of, oscillation as a result of a change in the tuning of the plate circuit, the latter being accomplished by varying either the capacity of unit A connected to 22, or the inductance 23 in the plate-tuned circuit. Provision is made in our invention to avoid double operation of the relay by employing an oscillator whose D.-C. plate current vs. capacity curve is such that the D.-C. plate current rise above the minimum D.-C. plate current does not exceed the relay differential at any point over the open (relay armature released) side of the operating range.

In Fig. 2 there is plotted the D.-C. plate current (I) as a function of the capacitance (C) in the plate circuit, i. e. the capacity of Fig. 1A. As the capacitance in the tuned plate circuit is varied, the D.-C. plate current varies as shown. With the tuned plate circuit inductive compared to the natural frequency of the crystal (i. e. capacitance of Fig. 1A small), oscillations increase in amplitude as the capacitance in the tuned circuit is increased and with the increase in amplitude of oscillations, the D.-C. plate current decreases, as shown in the portion 43 of Fig. 2. As the capacitance of Fig. 1A is increased, the amplitude of oscillations increases and the D.-C. plate current decreases until finally the tube snaps out of oscillation as shown by part 42—44 of the curve of Fig. 2. The D.-C. plate current is found to change abruptly at the point at which oscillation stops and with further increase in the capacity of Fig. 1A the D.-C. plate current remains constant as illustrated at 40 in Fig. 2. It is apparent that at the capacitance indicated by abscissa 42, the circuit changes from an oscillating to a non-oscillating condition, i. e., the curve to the right of point 44 represents a non-oscillating condition of the circuit, and the curve to the left of point 42 represents an oscillating condition. As the capacitance of Fig. 1A is decreased below that of point 42 the degree of oscillation gradually decreases until it stops entirely at some very low value of capacitance.

Fig. 2 does not show the entire curve for low capacity values but should be considered as a curve showing only the limited range of normal changes of capacity in the Fig. 1A device. Thus zero on the abscissa of Fig. 2 can correspond to the residual capacity with the fluid removed from the Fig. 1A capacitor. If Fig. 2 were plotted to zero total capacitance, curve 43 would continue to rise to the left and eventually reach level 41 where oscillations finally stop. It may even rise somewhat above the non-oscillating value before oscillation ceases completely. In any event, it must return to level 41 or 40 when oscillation ceases. If a jump in plate current occurs in this end of the curve, it will be very small or negligible compared to the useful jump at 42—44.

The value of capacitance indicated by abscissa 42, at which the D.-C. plate-current step action occurs, is very closely that at which the resonant frequency of the plate tuned circuit is the same as the natural frequency of the crystal. At resonance $LC=(1/2\pi f_0)^2$, where $f_0$ is the natural frequency of the crystal, and L and C are the inductance and capacitance in the plate tuned circuit. C is substantially the capacitance of Fig. 1A.

An essential and important element of our invention resides in the grid resistor 24 of Fig. 1B. Resistor 24 is of a very high value. We have discovered that by using a high value for resistor 24 it is possible to extend the oscillating range of the circuit to very low values of plate tuning capacitance. The extension of the oscillating region to very low values of capacitance permits the repeat operation of the relay to be suppressed to the left (in the curve of Fig. 2) so that no difficulty can be encountered from this cause. We have found that for a triode-connected 1U4 tube as shown in Fig. 1B, the value of resistor 24 required to accomplish oscillations at low values of capacitance 22 is in excess of one megohm. Thus, the circuit of Fig. 1 will execute self-sustained oscillation provided that the caapcitance represented by condenser 22 together with the inductance 23 are tuned so that their circuit is inductive compared to the mechanical resonance frequency of crystal 21.

As shown by the curve of Fig. 2, if the capacity connected to terminals 22 is large, the circuit does not oscillate and the D.-C. plate current is indicated by the section of curve indicated by numeral 40, the plate current being of the value indicated by the ordinate 41. As the capacitance is decreased and passes through the value 42, the circuit of Fig. 1 starts to oscillate with the corresponding drop in its D.-C. plate current. In order to reduce the relay current to substantially zero at the point of oscillation 42, the buckout circuit 33, 34 of Fig. 1B is so adjusted by means of rheostat 34, as to counterbalance the normal D.-C. plate current (with circuit oscillating) at the point at which oscillation starts.

The curve 43 (Fig. 2) eventually reaches at its left end a value approaching 41, but as indicated above, this rise (not shown) is suppressed to capacitance values approaching zero by the use of a very high value for the grid resistance 24. The curve 43 may in this manner be prevented from reaching a value which is sufficiently above zero to actuate the relay element 25. Thus, by using a very large grid-leak resistor 24, we have substantially increased the relay-open range and lowered the sensitivity in the relay-open range without materially changing the critical sensitivity. Although the larger grid-leak resistor yields greater tube bias, the extension of the oscillating region to lower values of capacitance is a useful and novel characteristic of our invention. The resulting broader open range is of particular value when the electrical circuit is to be manually adjusted for relay operation only after a large change in the capacitance of unit A connected to 22. Fig. 2 shows that the D.-C. plate current in the oscillating region compared to the non-oscillating region is a single-valued function of relay-actuation vs. capacitance under any conditions normally encountered. In this manner a very large range of capacity accommodation becomes available without loss of sensitivity of the system in passing through the D.-C. plate-current discontinuity 42—44. The actual scale of the abscissa of Fig. 2 may be adjusted so that the point 42 occurs at any desired value by adjusting the inductance 23. The latter may be done by means of an adjustable core or air-gap or other well-known means.

In any oscillator, there must be feedback from the plate or output circuit to the grid or input circuit to sustain oscillations. The feedback must be in a proper phase relationship as well as in sufficient amplitude to build up or sustain oscillations. In the circuit of Fig. 1, the inter-electrode capacitance of the tube plus wiring capacitance between the grid and plate circuits provide the feedback, and the phase of the feedback depends on the resonance phenomena in the crystal and in the tuned plate circuit. It is well known that crystals and tuned circuits such as 22—23 have high impedance at resonance but provide opposite phase shifts on opposite sides of their resonant peaks. In the operation of Fig. 1B, when the capacitance in the plate circuit passes point 42, there is a phase reversal in the tuned plate circuit with respect to the crystal frequency, and this phase reversal changes the circuit from a regenerative or oscillating state to a degenerative or non-oscillating state. At very low values of capacitance 22, the plate circuit may be relatively inefficient at the crystal frequency, yet the phase relationship will be proper so that oscillation occurs provided the grid circuit can respond. If the grid resistor 24 has a large value, the grid circuit impedance will be high at the resonant crystal frequency so that the grid circuit will respond, and oscillation will occur.

All oscillators do not behave the same as Fig. 1B as they go into oscillation. In some cases the plate current may increase with oscillation, or increase to a certain point and decrease thereafter. In some cases, there may be a "blacklash" effect at point 42 wherein the point occurs at different values for increasing and for decreasing capacitance values. These effects are avoided in our circuit by using a large grid leak, a relatively large inductance-to-capacity ratio in the plate circuit, and a suitable vacuum tube.

When oscillations build up in the circuit of Fig. 1B, the high value of grid resistance allows the grid of tube 20 to swing through quite a large voltage range. Even for the weaker oscillations, this causes a rectification effect in the grid circuit and builds up a negative bias voltage on the grid. It is this bias voltage which reduces the average plate current and provides the relay control.

Our invention may advantageously be employed in a device for detecting the presence of water in hydrocarbon fluids whose composition otherwise remains unchanged because an increased quantity of water in the mixture will increase the capacitance of the probe unit of Fig. 1A. When this capacity reaches the operating point 42, indicated in Fig. 2, the circuit of Fig. 1B abruptly ceases oscillation, whereupon the D.-C. plate current jumps to a higher value, i. e. the relay current jumps to the value 41, causing the relay coil 25 to pull up the armature 30 and actuate an alarm, indicator or control means (not shown).

Our invention is useful for detecting water in crude oil coming from a well, or water in the fuel being supplied to an engine, or water in the lubricating-oil supply of any machinery, and may actuate an appropriate alarm whenever an undesirably large percentage of water is encountered.

Our invention may also be used to detect water in an oil-base drilling fluid. By lowering the apparatus into a well which is being drilled with oil-base drilling mud it may be used to signal the depth at which water enters the well.

Our invention is also useful in dispatching petroleum products through pipe lines. It has been found that different products such as gasoline, kerosene, fuel oil, etc. differ sufficiently in dielectric constant to shift the capacity C through the operating point 42—44 of Fig. 2, thus signaling the arrival of an interface in a transporting pipe line. Our invention has been found to have sufficiently high sensitivity to reliably distinguish between commercially-equivalent gasolines from different sources, or to distinguish between crude oils of different sources and different "gravity."

While we have shown our invention as operating an indicator 29 or a relay 25, it is apparent that the relay 25 may actuate many other devices in well-known manner. Thus, the relay may actuate a remote indicator or alarm, a valve or other controlling mechanism, or a recording mechanism. In the latter case, the recorder may be made to produce a continuous record of the capacitance C instead of a simple on-off indication by having the recording pen-drive mechanism effect a compensating adjustment on inductance 23. Other useful applications of our invention will become evident to those skilled in the art.

What we claim as our invention is:

1. An apparatus for detecting changes in the composition of a fluid stream which comprises an electrical condenser through which the fluid is caused to flow, a crystal-controlled vacuum-tube circuit capable of executing sustained oscillations and having an electrically-resonant portion in the plate circuit of the vacuum tube, means electrically connecting said condenser as an element in said resonant portion of said circuit, a grid resistor sufficiently high to effect an unstable transition between oscillation and nonoscillation of said circuit and to permit sustained oscillations of said circuit at capacity values of said condenser which substantially approach zero, and a direct-current indicator connected in the plate circuit of said vacuum tube.

2. An apparatus for detecting changes in the composition of a fluid stream which comprises an electrical condenser through which the fluid is caused to flow, a crystal-controlled vacuum-tube circuit capable of executing sustained oscillations and having an electrically-resonant portion in the plate circuit of the vacuum tube, means electrically connecting said condenser as an element in said resonant portion of said circuit, a grid resistor having a resistance so high to effect an unstable transition between oscillation and nonoscillation of said circuit and as to permit sustained oscillations of the circuit when the tuning is predominately inductive with respect to resonant conditions, and a direct-current indicator connected in the plate circuit of said vacuum tube.

3. An apparatus for detecting changes in the composition of a fluid stream which comprises an electrical condenser through which the fluid is caused to flow, a vacuum tube having a cathode grid and anode, a parallel resonant circuit comprising said condenser and an inductance connected in parallel therewith having one terminal connected to the anode of said tube, a source of electrical power connected between the cathode of said tube and the other terminal of said resonant circuit, an electromechanically-resonant crystal electrically connected between the grid and the cathode of said tube, a resistor in parallel with said crystal of sufficiently high resistance to effect an unstable transition between oscillation and nonoscillation of said resonant circuit and to effect sustained oscillations of said resonant circuit at capacity values of said condenser which substantially approach zero, and a direct-current indicator connected in the circuit of said vacuum tube responsive to the discontinuity in anode current at the capacity value characteristic of the oscillation-nonoscillation transition of said resonant circuit.

4. An apparatus for detecting changes in the capacity of a condenser which comprises a vacuum tube having a cathode grid and anode, a parallel resonant circuit comprising said condenser and an inductance connected in parallel therewith having one terminal connected to the anode of said tube, a source of electrical power connected between the cathode of said tube and the other terminal of said resonant circuit, an electromechanically-resonant crystal electrically connected between the grid and the cathode of said tube, a resistor in parallel with said crystal of sufficiently high resistance to effect an unstable transition between oscillation and nonoscillation of said resonant circuit at a critical adjustment of said resonant circuit, and indicating means connected to said vacuum tube responsive to the discontinuity in anode current at the oscillation-nonoscillation transition of said resonant circuit.

References Cited in the file of this patent

UNITED STATES PATENTS

| | | |
|---|---|---|
| 2,043,241 | Eyer | June 9, 1936 |
| 2,222,221 | Burford | Nov. 19, 1940 |
| 2,297,346 | Crist | Sept. 29, 1942 |
| 2,369,954 | Downey | Feb. 20, 1945 |
| 2,485,579 | Elliott | Oct. 25, 1949 |
| 2,518,045 | May | Aug. 8, 1950 |
| 2,568,852 | Goddard | Sept. 25, 1951 |
| 2,588,882 | Rolfson | Mar. 11, 1952 |
| 2,654,067 | Bruce | Sept. 29, 1953 |